July 9, 1957 J. G. EDRICH 2,798,950

PULSE DETECTING NETWORK

Filed July 5, 1955

INVENTOR
Joseph G. Edrich
BY
William R. Lieberman
ATTORNEY

1

2,798,950

PULSE DETECTING NETWORK

Joseph G. Edrich, New York, N. Y., assignor to Del-Pro Corporation, Brooklyn, N. Y., a corporation of New York Application July 5, 1955, Serial No. 520,058

3 Claims. (Cl. 250—27)

The present invention relates generally to an improved discriminating method and circuit network, and in particular it relates to an improved method and apparatus for recording, registering or detecting electrical pulses followed by spurious signals.

Many systems and processes are responsive to electrical signal pulses which are often accompanied and immediately followed by high amplitude spurious signals of various types. These signals have been in the nature of damped waves or of high random noises decreasing in amplitude in a random nature to steady state level following a signal pulse. Examples of such systems are often encountered in the electrical detection and counting of target hits of many types. It is necessary in these cases for proper operation to adjust the system so as to respond only to the desired pulses and be unresponsive to the spurious signals. While this could be done by completely blocking the system for a predetermined interval following a signal pulse, it is undesirable to do so since the resolution of the system is decreased because of its inability to detect or register a pulse occurring during the blocked interval. Another method would be to lower the sensitivity of the system so as to be substantially unresponsive to the spurious signals. This latter method is likewise undesirable since the system may not respond to the signal pulses of a lower level.

It is, therefore, a principal object of the present invention to provide an improved signal responding method and apparatus.

Another object of the present invention is to provide an improved method for recording, counting or registering electrical pulses which are followed by spurious signals.

Still another object of the present invention is to provide an improved circuit network for recording, counting or registering electrical pulses which are followed by spurious signals.

A further object of the present invention is to provide an improved circuit network for registering electrical pulses followed by spurious signals and characterized by its high sensitivity and resolving power.

Still a further object of the present invention is to provide an improved electrical pulse responsive network of high sensitivity and resolving power and unresponsive to spurious signals following the electrical pulse.

Figure 1:
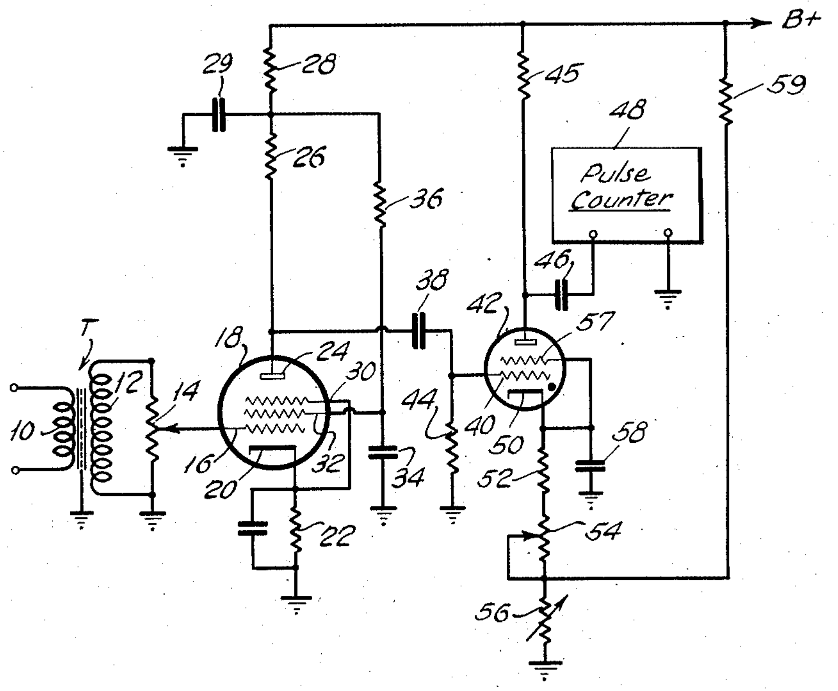
Figure 2:
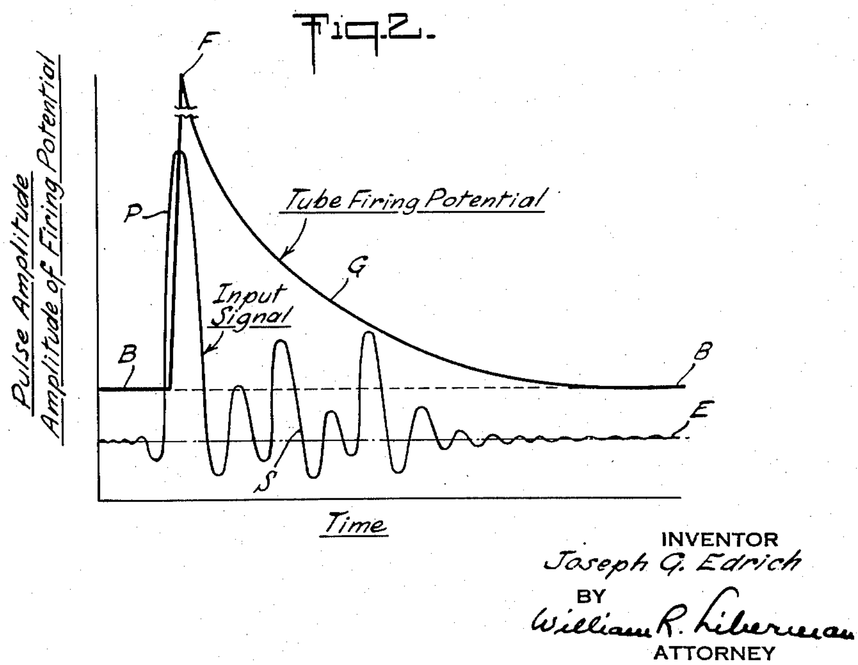

The above and other objects of the present invention will become apparent from a reading of the following description taken in conjunction with the accompanying drawings, wherein:

Figure 1 is a schematic diagram of a circuit network embodying the present invention; and Figure 2 is a graph, partially broken away, illustrating the amplitude of the pulse input signal and the accompanying spurious signal and the required tube firing potential plotted against time.

In a sense, the present invention contemplates the provision of a method of counting electrical pulses followed by intervals of spurious signals of decreasing amplitude, the method comprising the application of said pulses to the input of a discharge-type switch having a predetermined sensitivity whereby to actuate said switch, reducing the sensitivity of said switch immediately following the actuation thereof and gradually increasing said sensitivity to said predetermined sensitivity. The improved circuit network includes a discharge-type switch having an input and an output, means for applying a pulse followed by spurious signals to said input, means for decreasing the sensitivity of said switch following the application of said pulse, said means including an impedance, means for charging said impedance upon actuation of said switch, the sensitivity of said switch varying as the charge on said impedance, and means for discharging said impedance following the actuation of said switch in a predetermined time interval.

2

Reference is now made to the drawing which illustrates a preferred embodiment of the present invention wherein T designates a step-up input transformer, the input pulse and the following spurious signals being applied to the primary 10 thereof. The secondary 12 of the transformer T is shunted by the resistance element of a potentiometer 14, one end of which is grounded and the adjustable arm of which is connected to the control grid 16 of a pentode 18. Pentode 18 is connected as an amplifier in a conventional manner, cathode 20 thereof being grounded through a parallel capacitor-resistor network 22 to impress an operating bias on the cathode 20. Anode 24 of pentode 18 is connected through a pair of series-connected resistors 26 and 28 to the positive terminal of a suitable plate power supply, the junction of resistors 26 and 28 being grounded through a de-coupling condenser 29. The suppressor grid 30 of pentode 18 is connected directly to cathode 20, while the screen grid 32 is grounded through capacitor 34 and is connected through a resistor 36 to the junction point of the resistors 26 and 28.

The output of amplifier pentode 18 is taken directly from the anode 24 and coupled by way of a capacitor 38 to the firing grid 40 of a gas tetrode 42, which grid is grounded by way of a resistor 44. The anode of gas tetrode 42 is connected through a current-limiting resistor 45 to the positive terminal of the plate power supply, and is connected through a capacitor 46 to a pulse counting device 48 of any suitable conventional construction. Cathode 50 of gas tetrode 42 is connected by way of a series-connected high-value resistor 52, the resistance element of a potentiometer 54, and rheostat 56 to ground. The arm of potentiometer 54 is connected to the junction point of the resistance element thereof and the rheostat 56 and through a resistor 59 to the positive terminal of the plate power supply. The gas tetrode cathode 50 also is connected to the tube electrode 57, and is grounded through a condenser 58 which forms part of the automatic sensitivity control as will be hereinafter described.

It will be seen that the sensitivity of the circuit is adjustable by means of the potentiometer 14 which varies the percentage of the output of the transformer T applied to the pentode-controlled grid 16, and by the rheostat 56 which varies the steady state positive bias applied to cathode 50 thereby to control the firing signal which must be applied to grid 40.

In operation, an input signal followed by spurious signals is applied to the primary of the transformer T, stepped-up and amplified by pentode 18. The output of pentode 18, as applied to firing grid 40 of gas tetrode 42, is illustrated—by way of example—by the wave form in the graph of Figure 2, the pulse being designated as P and the following spurious signal being designated as S and shown of a random nature approaching a steady state E. The steady state firing potential of the gas tetrode 42 is designated as B. The pulse P applied to the gas tetrode firing grid 40 exceeds the steady state firing potential of the tetrode 42, thereby ionizing the gas therein and causing the tetrode 42 to become highly conductive. By reason of the high conductivity of the ignited gas tetrode 42, condenser 58 is rapidly charged to a value substantially approaching the positive potential of the plate power supply, less the voltage drop in gas tetrode 42 and resistor 45, which is relatively low.

Immediately following the charging of condenser 58, tetrode 42 is quenched by reason of the reduced current passing therethrough. Upon quenching of tetrode 42, the firing grid 40 regains control. Because cathode 50 has reached a high positive potential as a consequence of the charging of the condenser 58, a high signal is required to fire the gas tetrode 42, such point being designated at F on the graph. However, condenser 58 discharges in an exponential fashion through resistor 52, potentiometer 54 and rheostat 56 to reduce the required signal on control grid 40 to fire the gas tetrode 42.

In order to avoid firing gas tetrode 42 by the spurious signals, it is necessary that the tube firing potential, as indicated by the curve G, should be greater than the input spurious signal applied to the firing grid 40, as indicated in the graph. Should any of the noise fall above the gas tetrode firing potential, a spurious count will be effected. The rate of discharge and hence the sensitivity of the gas and tetrode, with respect to time, can be adjusted by the potentiometer 54 and is dependent upon the capacity of the condenser 58 and the aggregate resistance of the resistors 52 and 54.

An example of a circuit which has been found highly satisfactory in connection with the registering of hits effected on a target of the conductive sheet-type, wherein an electric pulse is generated upon a missile piercing the conductive sheet momentarily and sharply to vary its resistance, the sheet being connected to a source of voltage, is as follows: Pentode 18 is of the 12–AU–6 type, and the various components connected thereto are conventional and being well-known in the art require no designations. The coupling capacitor 38 is 10,000 microfarads and the resistor 44 is 470K ohms. The gas tetrode 42 is type 5663, the resistor 52 is 1.5 megohms, the potentiometer 54 is 1.0 megohm, and the rheostat 56 is 18K ohms. The resistor 45 is 82K ohms, and the resistor 59 is 1.5 megohms, and the automatic firing potential control condenser 58 is 1,500 microfarads. The plate power supply in the subject example is approximately 400 volts.

With the above values, and rheostat 56 set at its highest value, the steady state bias on the control grid 40 of the gas tetrode 42 is approximately minus 5 volts, with respect to the cathode, and since the firing potential under the conditions set forth is approximately minus 3 volts, a pulse signal of approximately plus 2 volts or greater is required to fire gas tetrode 42 and effect the registry of a count on the pulse counter 48. The time for tetrode 42 substantially to reach its steady state following the firing and quenching thereof can be adjusted by means of the potentiometer 54 within the range of approximately 40 to 70 milliseconds. This range may be varied as desired by changing the value of the condenser 58, the resistor 52 and the potentiometer 54, or any of them.

While there has been described and illustrated a preferred embodiment of the present invention, it is apparent that numerous alterations and omissions may be made without departing from the spirit thereof.

I claim:

1. A circuit network comprising a gas discharge tube including a cathode and anode and a firing electrode, a first resistor connecting said firing electrode to ground, a capacitor connected between said cathode and ground, a pair of series-connected second and third resistors connecting said cathode to ground, means for connecting said anode to a source of positive potential, and a fourth resistor connecting said source of positive potential to the junction point of said second and third resistors.

2. A circuit network in accordance with claim 1, wherein said second resistor is variable.

3. A circuit network in accordance with claim 1, wherein said third resistor is variable.

References Cited in the file of this patent

UNITED STATES PATENTS 2,288,554 Smith ---------------- June 30, 1942